No. 659,819. Patented Oct. 16, 1900.
B. F. LOCKWOOD.
VALVE FLOAT FOR FLUSH TANKS.
(Application filed May 28, 1900.)
(No Model.)
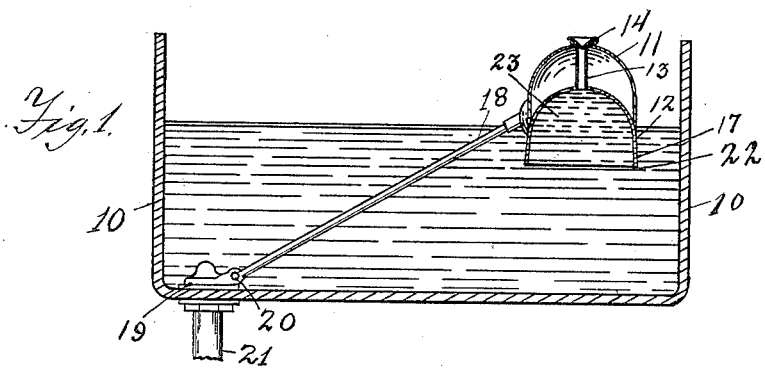
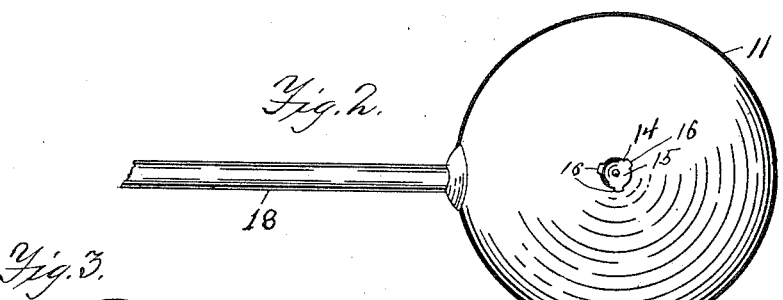
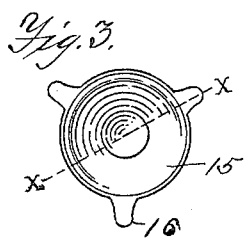
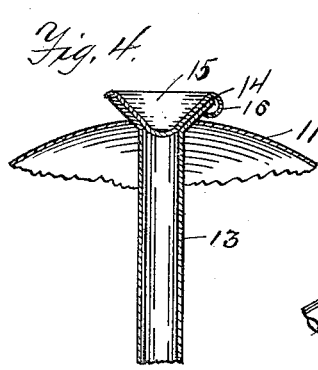
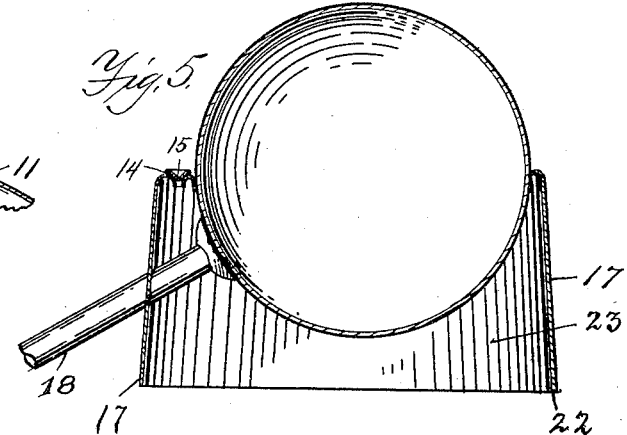
WITNESSES:
N. E. Thomas
D. M. Rogerson
INVENTOR
Benjamin F. Lockwood
BY
A. Arthur Baldwin
ATTORNEY

UNITED STATES PATENT OFFICE.

BENJAMIN F. LOCKWOOD, OF JAMESTOWN, NEW YORK.

VALVE-FLOAT FOR FLUSH-TANKS.

SPECIFICATION forming part of Letters Patent No. 659,819, dated October 16, 1900.

Application filed May 28, 1900. Serial No. 18,291. (No model.)

*To all whom it may concern:*

Be it known that I, BENJAMIN F. LOCKWOOD, a citizen of the United States, and a resident of Jamestown, in the county of Chautauqua and State of New York, have invented a new and useful Valve-Float for Flush-Tanks, of which the following is a specification.

My invention relates to floats for closing the valves in the supply-pipes of flush-tanks and similar vessels; and the object of my improvement is to construct my float with an open chamber on its under side and a valvular opening from said chamber that the air may escape and the chamber fill with water as the tank fills and also that the suction of the water in the chamber as the water recedes in emptying the tank shall close said valvular opening and hold the water in the chamber until the added weight of the water so held overcomes any resistance which may exist at the inlet-valve. I find that the float is necessarily made light that the air in the float may insure the closing of the inlet-valve; but on account of this necessary light weight for the float and the corrosion or incrustation of the inlet-valve said inlet-valve often fails to act in flush-tanks which have been in use for some time and the float is left suspended in the air when the water is let out of the tank.

My valve-controlled chamber allows the float to be of light weight, yet automatically adds the weight when it is needed to insure the opening of the valve.

I accomplish my object by mechanism shown in the accompanying drawings, in which—

Figure 1 is a sectional view of a flush-tank and my improved float with the water held in the lower chamber by the suction of the air-valve. Fig. 2 is a plan view of the float with the float-rod broken off. Fig. 3 is a detail plan view of the air-valve, showing the lugs before they are bent down under the edge of the valve-seat. Fig. 4 is a sectional view of valve at line X X in Fig. 3 and valve-seat and air-tube. Fig. 5 is a sectional view of a common ball-float with a valve and skirt attached, forming my valve-controlled chamber.

Similar numerals refer to similar parts in the several views.

10 is the flush-tank, 11 the upper part of my improved float, which is made cup-shaped, and 12 is the lower part, also made cup-shaped and extending down in a skirt 17 to form the lower chamber. These two cup-shaped parts fit into one another, as shown, making a tight air-chamber in the upper part of sufficient size to raise the float and close the inlet-valve and a cup-shaped chamber 23 in the lower part. Air-tube 13 extends up from chamber 23 to the top of the float or out into the air and ends in a valve-seat 14. Valve 15 is made cup-shaped to fit the seat and with lugs 16 16 on the edge, which lugs bend down under the edge of the valve-seat and hold the valve in place on its seat. This makes a light, cheap, and efficient valve which covers the valve-seat and is dustproof and sure in its working.

Fig. 5 shows a common ball-float with a skirt 17 attached around the middle of the ball and forming a chamber 23 and having a valve-seat 14 and valve 15 at the upper edge of the skirt. My improved skirt can be attached to any float and insure the prompt action of the inlet-valve. 18 is the float-rod; 19, the inlet-valve; 20, the hinge for same; 21, the supply-pipe.

I find that when the flush-tank is empty and the float rests on the bottom of the tank on the point 22 of the skirt and inlet-valve 19 is accordingly wide open the water rushes in and fills the tank to about the lower end of air-tube 13 as the float rises and closes the valve 19, thus aiding in the quick refilling of the tank. My improved float insures, therefore, the prompt filling of the flush-tank.

I claim as new—

1. A valve-float consisting of an air-tight chamber, a chamber on said air-tight chamber open on its lower side, an outwardly-opening air-operated check-valve to control the air and water in said lower chamber, as shown and described.

2. A valve-float consisting of two cup-shaped pieces fitted together to form an air-tight chamber and a cup-shaped chamber as shown, an outwardly-opening air-operated check-valve attached to said cup-shaped chamber to control the air and water therein, as shown and for the purpose specified.

In testimony whereof I have signed my name to this specification in the presence of two subscribing witnesses.

BENJAMIN F. LOCKWOOD.

Witnesses:
D. M. ROGERSON,
N. E. THOMAS.